United States Patent
Chong et al.

(10) Patent No.: US 12,125,480 B2
(45) Date of Patent: Oct. 22, 2024

(54) SYSTEM AND METHOD FOR ENCOURAGING GROUP DISCUSSION PARTICIPATION

(71) Applicant: MOTOROLA SOLUTIONS, INC., Chicago, IL (US)

(72) Inventors: Joe Yie Chong, Ipoh (MY); Nur Amalina Rosly, Taiping (MY); Wei Theng Wong, Bandar Baru Air Itam (MY); Anoop Sehgal Paras Ram, Ipoh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 266 days.

(21) Appl. No.: 17/456,893

(22) Filed: Nov. 30, 2021

(65) Prior Publication Data

US 2023/0169966 A1 Jun. 1, 2023

(51) Int. Cl.
G10L 15/183 (2013.01)
G10L 25/48 (2013.01)
G10L 25/78 (2013.01)

(52) U.S. Cl.
CPC ............ *G10L 15/183* (2013.01); *G10L 25/48* (2013.01); *G10L 25/78* (2013.01); *G10L 2025/783* (2013.01)

(58) Field of Classification Search
CPC ....... G10L 15/183; G10L 25/48; G10L 25/78; G10L 2025/783; H04W 4/10; G06F 40/35
See application file for complete search history.

(56) References Cited

U.S. PATENT DOCUMENTS

| | | | |
|---|---|---|---|
| 7,801,953 B1 * | 9/2010 | Denman | H04L 65/4061 370/312 |
| 9,961,516 B1 * | 5/2018 | Proctor | H04L 5/16 |
| 10,631,139 B2 | 4/2020 | Proctor | |
| 2006/0058007 A1 * | 3/2006 | Choksi | H04W 4/08 455/406 |
| 2008/0004060 A1 * | 1/2008 | Suzuki | H04W 4/10 455/518 |
| 2008/0140421 A1 * | 6/2008 | Marturano | G10L 17/00 704/275 |
| 2009/0176460 A1 * | 7/2009 | Mienville | H04W 84/08 455/90.2 |
| 2015/0207765 A1 | 7/2015 | Brantingham et al. | |
| 2016/0183066 A1 * | 6/2016 | Chandler | H04W 48/16 455/518 |

(Continued)

*Primary Examiner* — Douglas Godbold

(57) ABSTRACT

Techniques for encouraging group discussion participation are provided. A conversational analytics system monitors a discussion within a Push to Talk (PTT) radio talkgroup. A topic of discussion within the PTT radio talkgroup is identified. A participation level of each member of the PTT radio talkgroup is identified. It is determined that a member of the PTT radio talkgroup may have information relevant to the topic of the discussion within the PTT radio talkgroup. It is determined that the participation level of the member determined to have information relevant to the topic of discussion within the PTT radio talkgroup is below a threshold. The member determined to have information relevant to the topic of discussion within the PTT radio talkgroup is prompted to participate in the discussion.

14 Claims, 7 Drawing Sheets

(56) References Cited

U.S. PATENT DOCUMENTS

| | | | |
|---|---|---|---|
| 2016/0203831 A1* | 7/2016 | Elyashiv | G06Q 10/101 |
| | | | 704/270 |
| 2017/0097928 A1 | 4/2017 | Jones et al. | |
| 2018/0013800 A1* | 1/2018 | Morrison | G06F 16/951 |
| 2019/0082304 A1* | 3/2019 | Bestor | G06F 16/90332 |
| 2019/0108493 A1* | 4/2019 | Nelson | G06Q 10/1095 |
| 2019/0319898 A1* | 10/2019 | Scanlon | G06N 5/01 |
| 2020/0372475 A1* | 11/2020 | Bastide | G06Q 10/1095 |
| 2020/0395017 A1 | 12/2020 | Siddoway et al. | |
| 2021/0058264 A1* | 2/2021 | Fahrendorff | H04L 12/1822 |
| 2021/0110844 A1* | 4/2021 | Miyake | G06V 40/174 |
| 2021/0377062 A1* | 12/2021 | Stevens | H04L 12/1827 |
| 2021/0383127 A1* | 12/2021 | Kikin-Gil | G06V 10/811 |

* cited by examiner

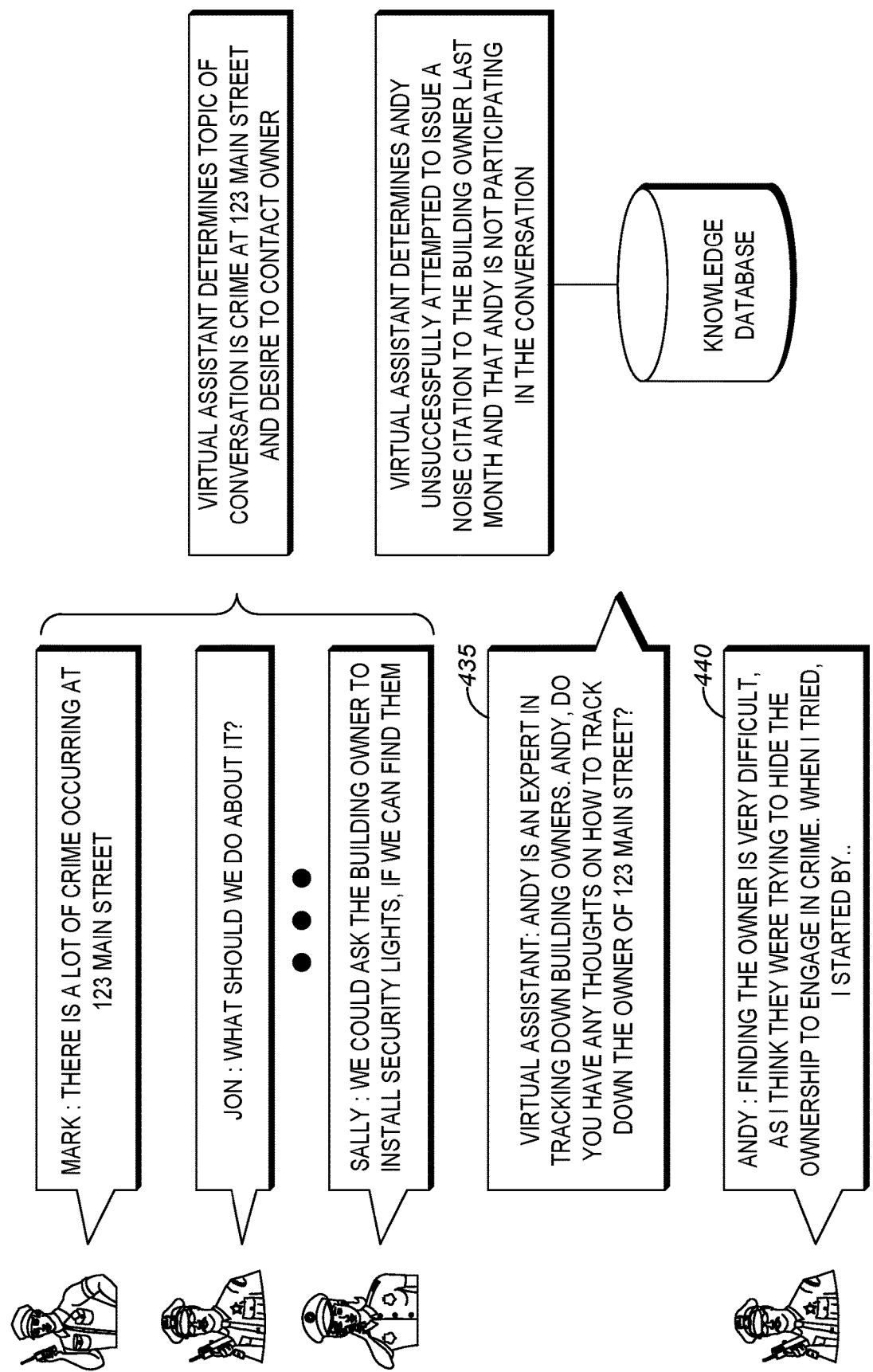

SYSTEM AND METHOD FOR ENCOURAGING GROUP DISCUSSION PARTICIPATION

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 4 is an example conversation wherein an appeal to a user's ego is generated to encourage group discussion participation.

Figure 1:
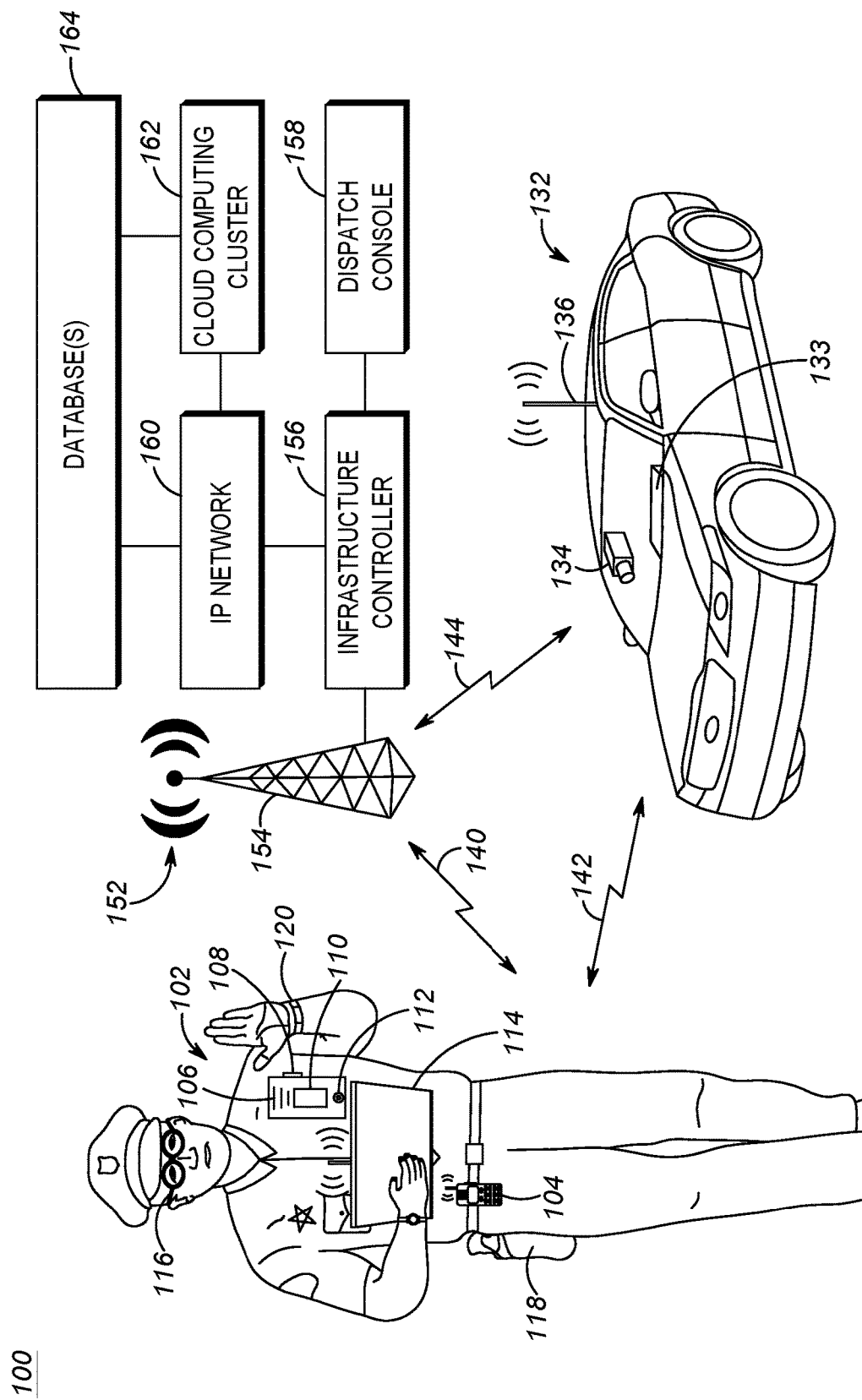
FIG. 1 is an example system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel, such as law enforcement officers, often engage in group discussions using communications devices such as Land Mobile Radios (LMR). The communications devices are often colloquially referred to as walkie-talkies, and operate in a half duplex Push-to-Talk (PTT) mode. When a user presses the PTT button on his device, he is able to speak to all members of the group, which may be referred to as a talkgroup. When the PTT button is released, another member of the talkgroup may press the PTT button on their device and begin speaking to the group. PTT device functionality may also be implemented on more generally available devices, such as cellular phones. This feature is often called PTT over Cellular (PoC).

The number of participants in a talkgroup can range from two people to hundreds or even thousands of people. The topics of discussion in a talkgroup is not limited by the PTT technology. In a law enforcement context, talkgroup discussions may be related to things such as planning a response to an incident, discussing a course of action to take in resolving an incident, general dispatch communications, or any other such topic. A talkgroup participant may have information that would be beneficial to the group. For example, they may have domain specific knowledge about the topic currently being discussed, they may have relevant experience in the topic currently being discussed, they may be an expert in the topic being discussed, etc.

A problem arises in that in some cases, the talkgroup participant that has information relevant to the topic being discussed may not provide that information to the talkgroup. In some cases, the participant with the knowledge may be reluctant to speak because they are shy, an introvert, etc. In some cases, the participant with the knowledge may be reluctant to speak because they do not feel the level of their knowledge that can be provided would be beneficial to the other members of the talkgroup. In some cases, the participant with the knowledge may have forgotten that they have information relevant to the topic of discussion. In the most simple case, the participant with the knowledge may have not been paying attention to the talkgroup discussion (e.g. engaged in higher priority activities, simply not listening, etc.) and is completely unaware that they possess knowledge that could aid in the discussion. Regardless of the reason why, there may be a participant with knowledge related to the topic of discussion within a talkgroup that may not be providing that knowledge to the other members of the talkgroup.

The encourage group discussion participation techniques described herein solve these problems, individually and collectively. A virtual assistant may utilize conversational analytics to identify the topic of discussion within a talkgroup. Once identified, the virtual assistant may use one of several techniques to determine the level of participation of each member of the talkgroup. Upon finding a member that does not appear to be sufficiently participating, the virtual assistant may examiner historical data related to the non-participating member to determine if the member may have information that is related to the topic of discussion. If so, the virtual assistant generates questions that are sent to members of the talkgroup, including the non-participating member, to encourage participation in the group discussion. In some cases, the virtual assistant may appeal to the non-participating member's ego in order to encourage group discussion participation.

A method is provided. The method includes monitoring, with a conversational analytics system, a discussion within a Push to Talk (PTT) radio talkgroup. The method also includes identifying a topic of discussion within the PTT radio talkgroup. The method also includes identifying a participation level of each member of the PTT radio talkgroup. The method also includes determining that a member of the PTT radio talkgroup may have information relevant to the topic of the discussion within the PTT radio talkgroup. The method also includes determining that the participation level of the member determined to have information relevant to the topic of discussion within the PTT radio talkgroup is below a threshold. The method also includes prompting the member determined to have information relevant to the topic of discussion within the PTT radio talkgroup to participate in the discussion.

In one aspect, identifying the participation level of each member of the PTT radio talkgroup further comprises at least one of monitoring a number of PTT button presses for each member of the PTT radio talkgroup and monitoring, at a PTT infrastructure, call statistics for each member of the PTT radio talkgroup. In one aspect, identifying the participation level of each member of the PTT radio talkgroup further comprises monitoring a frequency of talkgroup switching. In one aspect, identifying the participation level of each member of the PTT radio talkgroup further comprises using the conversational analytics system to identify an amount of time each member of the PTT radio talkgroup is speaking.

In one aspect, prompting the member determined to have information relevant to the topic of discussion within the PTT radio talkgroup to participate in the discussion further comprises directing, via the conversational analytics system, at least one question to the member determined to have information relevant to the topic of discussion within the PTT radio talkgroup. In one aspect, prompting the member determined to have information relevant to the topic of discussion within the PTT radio talkgroup to participate in the discussion further comprises announcing, via the conversational analytics system, that the member determined to have information relevant to the topic of discussion within the PTT radio talkgroup has expertise relevant to the topic of discussion within the PTT radio talkgroup and requesting input from the member determined to have information relevant to the topic of discussion.

In one aspect, the method further comprises determining that the member determined to have information relevant to the topic of discussion within the PTT radio talkgroup is currently engaged in other activities and lower the threshold to reduce interruption of the member determined to have information relevant to the topic of discussion. In one aspect, the method further comprises continuing to monitor participation of the member determined to have information relevant to the topic of discussion, determining that participation of the member determined to have information relevant to the topic of discussion is still below the threshold, and modifying the prompt to the member determined to have information relevant to the topic of discussion.

A system is provided. The system includes a processor and a memory coupled to the processor, the memory containing a set of instructions thereon. The instructions that when executed by the processor cause the processor to monitor, with a conversational analytics system, a discussion within a Push to Talk (PTT) radio talkgroup. The instructions further cause the processor to identify a topic of discussion within the PTT radio talkgroup. The instructions further cause the processor to identify a participation level of each member of the PTT radio talkgroup. The instructions further cause the processor to determine that a member of the PTT radio talkgroup may have information relevant to the topic of the discussion within the PTT radio talkgroup. The instructions further cause the processor to determine that the participation level of the member determined to have information relevant to the topic of discussion within the PTT radio talkgroup is below a threshold. The instructions further cause the processor to prompt the member determined to have information relevant to the topic of discussion within the PTT radio talkgroup to participate in the discussion.

In one aspect, the instructions to identify the participation level of each member of the PTT radio talkgroup further comprises instructions to at least one of monitor a number of PTT button presses for each member of the PTT radio talkgroup and monitor, at a PTT infrastructure, call statistics for each member of the PTT radio talkgroup. In one aspect, the instructions to identify the participation level of each member of the PTT radio talkgroup further comprises instructions to monitor a frequency of talkgroup switching. In one aspect, the instructions to identify the participation level of each member of the PTT radio talkgroup further comprises instructions to use the conversational analytics system to identify an amount of time each member of the PTT radio talkgroup is speaking.

In one aspect, the instructions to prompt the member determined to have information relevant to the topic of discussion within the PTT radio talkgroup to participate in the discussion further comprises instructions to direct, via the conversational analytics system, at least one question to the member determined to have information relevant to the topic of discussion within the PTT radio talkgroup. In one aspect, the instructions to prompt the member determined to have information relevant to the topic of discussion within the PTT radio talkgroup to participate in the discussion further comprises instructions to announce, via the conversational analytics system, that the member determined to have information relevant to the topic of discussion within the PTT radio talkgroup has expertise relevant to the topic of discussion within the PTT radio talkgroup and request input from the member determined to have information relevant to the topic of discussion.

A non-transitory processor readable medium containing a set of instructions thereon is provided. The instructions, that when executed by a processor cause the processor to monitor, with a conversational analytics system, a discussion within a Push to Talk (PTT) radio talkgroup. The instructions further cause the processor to identify a topic of discussion within the PTT radio talkgroup. The instructions further cause the processor to identify a participation level of each member of the PTT radio talkgroup. The instructions further cause the processor to determine that a member of the PTT radio talkgroup may have information relevant to the topic of the discussion within the PTT radio talkgroup. The instructions further cause the processor to determine that the participation level of the member determined to have information relevant to the topic of discussion within the PTT radio talkgroup is below a threshold. The instructions further cause the processor to prompt the member determined to have information relevant to the topic of discussion within the PTT radio talkgroup to participate in the discussion.

In one aspect, the instructions on the medium to identify the participation level of each member of the PTT radio talkgroup further comprises instructions to at least one of monitor a number of PTT button presses for each member of the PTT radio talkgroup and monitor, at a PTT infrastructure, call statistics for each member of the PTT radio talkgroup. In one aspect, the instructions on the medium to identify the participation level of each member of the PTT radio talkgroup further comprises instructions to monitor a frequency of talkgroup switching. In one aspect, the instructions on the medium to identify the participation level of each member of the PTT radio talkgroup further comprises instructions to use the conversational analytics system to identify an amount of time each member of the PTT radio talkgroup is speaking.

In one aspect, the instructions on the medium to prompt the member determined to have information relevant to the topic of discussion within the PTT radio talkgroup to participate in the discussion further comprises instructions to direct, via the conversational analytics system, at least one question to the member determined to have information relevant to the topic of discussion within the PTT radio talkgroup. In one aspect, the instructions on the medium to prompt the member determined to have information relevant to the topic of discussion within the PTT radio talkgroup to participate in the discussion further comprises instructions to announce, via the conversational analytics system, that the member determined to have information relevant to the topic of discussion within the PTT radio talkgroup has expertise relevant to the topic of discussion within the PTT radio talkgroup and request input from the member determined to have information relevant to the topic of discussion.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communications System Structure Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices (wherein the single user 102 and the additional users may form a talkgroup of related users).

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, single coupled vehicular transceiver 136, and single speaker, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (i.e., short-range in comparison to the long-range transmitter such as a LMR or broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (i.e., talkgroup members not shown in FIG. 1) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user, perhaps including a suspect and the suspect's surroundings, storing the captured image and/or audio data for further analysis or transmitting the captured audio and/or video data as an audio and/or vide stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, remote microphone functionality for voice communications in cooperation with portable radio 104, and remote speaker.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

An in-ear or over-the ear earpiece or headphone (not shown) may be present for providing audio to the user in a private fashion that is not accessible to other users nearby the user 102. The earpiece or headphone may be wiredly or wirelessly communicatively coupled to one or both of the RSM 106 and the portable radio 104, which may be configured to provide audio received from the RAN 152 and/or from other users to the user 102 based on a manual configuration of the RSM 106 or the portable radio 104, or based on some automatic routing mechanism at the one of the RSM 106 and the portable radio 104 that may route all audio to the earpiece or headphone whenever it is detected as connected to the one of the RSM 106 and the portable radio 104, or may selectively route audio received at the one of the RSM 106 and the portable radio 104 to the earpiece or headphone based on various contextual parameters, such as a content of the received audio, an identity of who sent the received audio, a covert status of the user 102, an incident status of the user 102, a determination of nearby users associated with the user 102, or some other contextual parameter.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In other embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In still other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other electronic device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. The omni-directional or unidirectional microphone, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

Although FIG. 1 illustrates the vehicular video camera 134 and microphone as being placed inside the vehicle 132, in other embodiments, one or both of the vehicular video camera 134 and microphone may be placed at visible or hidden locations outside of the vehicle 132, such as within a vehicular grill portion or bumper portion, or on a roof portion, of the vehicle 132. Further, the single speaker (not shown) may be inside of the vehicle 132 and coupled to the vehicular computing device 133, in other embodiments, multiple speakers may be provided inside and/or outside of the vehicle 132 (all addressed simultaneously or individually addressable for outputting separate audio streams), or the single speaker may be placed outside of the vehicle and function as a PA speaker, among other possibilities.

The vehicle 132 may be a human-operable vehicle, or may be a self-driving vehicle operable under control of mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras and sensors) within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud compute cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (e.g., a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud compute cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

Database(s) 164 may be accessible via IP network 160 and/or cloud compute cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at infrastructure controller 156. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 disclosed herein and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police car or cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (e.g., a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (e.g., a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (e.g., a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (e.g., a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, front loader). As one other example, the communication system 100 may additionally or alternatively be a transportation logistics communication system including a user 102 that may be a bus driver or semi-truck driver at a school or transportation company and a vehicle 132 that may be a vehicle for use by the user 102 in furtherance of the driver's duties. In the examples of a user 102 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

b. Device Structure

Figure 2:
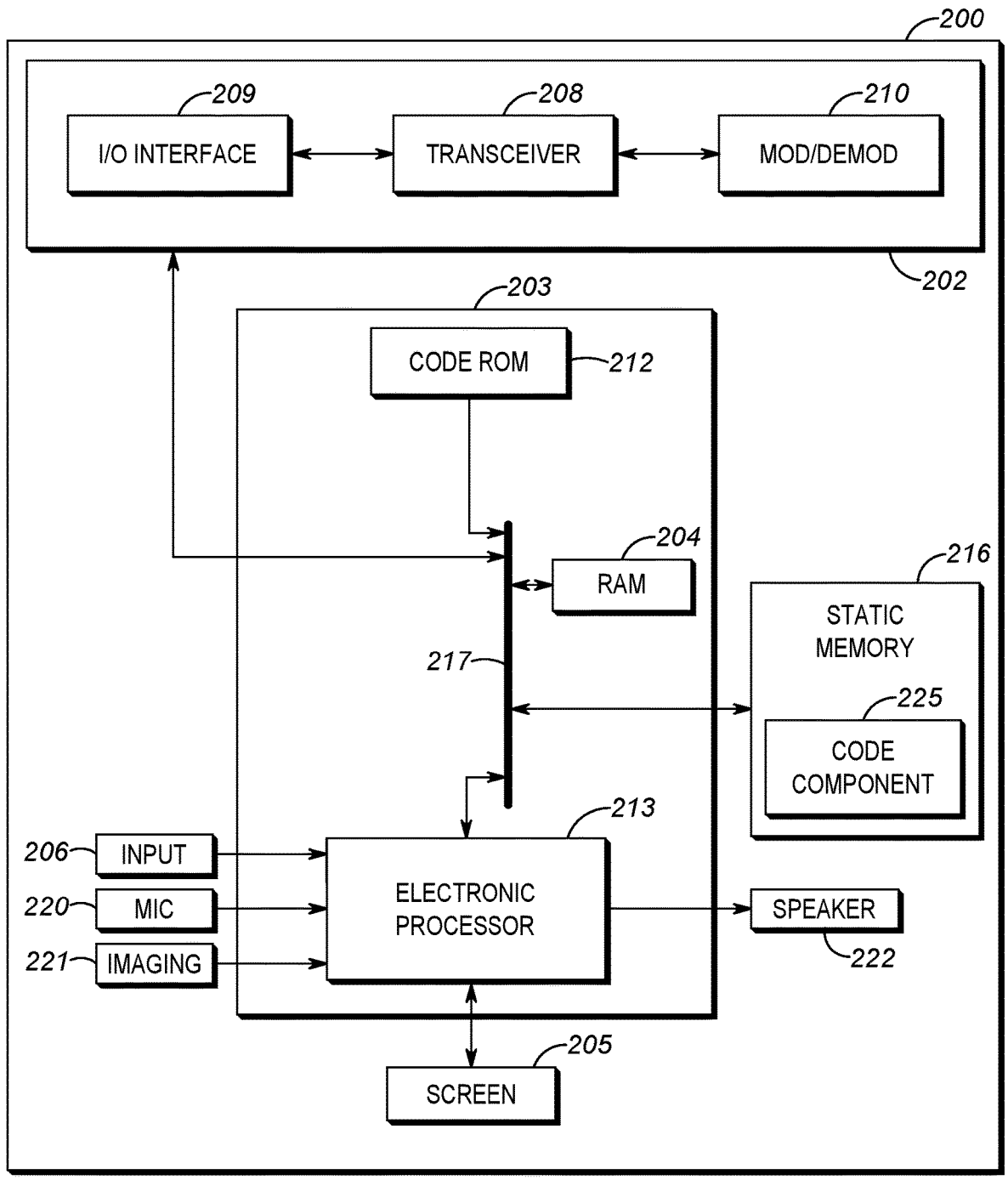
FIG. 2 is an example device diagram showing a device structure of an electronic computing device for operating an electronic digital assistant, in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud compute cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIG. 1, depending on the type of the communication device, the communication device 200 may include fewer or additional components in configurations different from that illustrated in FIG. 2. For example, in some embodiments, communication device 200 acting as the infrastructure controller 156 may not include one or more of the screen 205, input device 206, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, communication device 200 includes a communications unit 202 coupled to a common data and address bus 217 of a processing unit 203. The communication device 200 may also include one or more input devices (e.g., keypad, pointing device, touch-sensitive surface, etc.) 206 and an electronic display screen 205 (which, in some embodiments, may be a touch screen and thus also act as an input device 206), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the input device 206, the microphone 220, the imaging device 221, and/or the speaker 222. Static memory 216 may store operating code 225 for the electronic processor 213 that, when executed, performs one or more of the steps set forth in FIG. 3 and accompanying text.

In some embodiments, the static memory may also store, permanently or temporarily, instructions to cause the virtual assistant to use conversational analytics to identify the topic of discussion within a talkgroup. The static instructions could cause the virtual assistant to determine if there is a talkgroup member that is not participating in the group discussion. The static instructions could cause the virtual assistant to look in one or more databases to determine if the non-participating talkgroup member has information related to the topic of discussion that could be provided to the other members of the talkgroup. The static instructions could also cause the virtual assistant to generate questions and/or statements to encourage the non-participating member to participate in the group discussion.

The static memory 216 may comprise, for example, a hard-disk drive (HDD), an optical disk drive such as a compact disk (CD) drive or digital versatile disk (DVD) drive, a solid state drive (SSD), a flash memory drive, or a tape drive, and the like. A device such as device 200 is described in further detail with respect to FIGS. 5 and 6.

2. Processes for Detecting a Topic of Discussion within a Talkgroup and Encouraging Participation by a Non-Participating Talkgroup Member Who has Information Relevant to the Topic of Discussion In some embodiments, an individual component and/or a combination of individual components of the system 100 may be referred to as an electronic computing device that implements an electronic digital assistant, also referred to as a virtual assistant, as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end cloud compute cluster 162 accessible via the IP network 160.

The electronic digital assistant implemented by the electronic computing device may monitor talkgroup communications to determine a topic of discussion within the talkgroup. For example, the virtual assistant may be connected to the infrastructure controller 156 in order to receive all communications on the talkgroup. Furthermore, the virtual assistant may receive infrastructure based information, such as when a talkgroup member has pressed the PTT button from the infrastructure controller.

The virtual assistant may also implement a conversational analytics system that may be able to analyze the discussions on the talkgroup to determine the topic of discussion. For example, the electronic computing device may include a natural language processing (NLP) engine configured to determine the intent and/or content of the discussion. The techniques described herein are not dependent on any particular type of conversational analytics, and any such analytics, either currently known, or developed in the future, would be suitable for use with the techniques described herein. For purposes of ease of description, the virtual assistant that implements the conversational analytics system may be referred to as the conversational analytics system.

The virtual assistant may be configured to determine the level of participation of each member of the talkgroup. This may come from information provided by the communications device itself (e.g. the user device 104 reporting how long the PTT button is pressed), from the infrastructure controller (e.g. infrastructure controller 156 reporting how long a particular member has been granted the floor to speak to members of the talkgroup), or from the conversational analytics system itself (e.g. percentage of time a member is actually speaking to the talkgroup). In addition, although only a single talkgroup has been mentioned thus far, it should be understood that many talkgroups may exist. In most normal operations, a user can only listen to one talkgroup at a time. The user device 104 or infrastructure controller 156 may also report frequent talkgroup switching, indicating the user may not be paying attention to the talkgroup that includes the topic of discussion for which they may have relevant information.

The virtual assistant may access one or more databases that include information related to the knowledge of talkgroup participants. For example, a computer aided dispatch (CAD) system may include a database that stores information related to previous incidents handled by a talkgroup member. A human resources database may include skills that each talkgroup member possesses. A search history database may include previous searches by the talkgroup member which may be helpful in determining that the talkgroup member may have previously been researching the particular topic of discussion.

The virtual assistant may also be configured to generate questions and/or statements that can be communicated to all members of the talkgroup. The generated questions and/or statements may encourage a non-participating talkgroup member who has information relevant to the topic of discussion to add their knowledge to the talkgroup discussion. Although virtual assistants are typically used to provide answers directly, and the techniques described herein would be capable of allowing the virtual assistant to report the results of the database queries to the talkgroup directly, it would be preferable for the talkgroup member with the information relevant to the discussion to provide the information directly. This may aid in situations where the various databases have not fully captured the extent of the knowledge of the topic of discussion possessed by the non-participating member.

Although the techniques described herein are presented in terms of voice communications on a PTT system, it should be understood that the techniques are equally applicable to any other form of group communication. For example, a short message service (SMS) group, an email mailing list, an instant messenger group, a social media group, a video chat group, or any other form of group communication that can be monitored by a virtual assistant would be usable with the techniques described herein. Although the remainder of the description will be in terms of a PTT voice talkgroup, it should be understood that the techniques described herein are not so limited.

Figure 3:
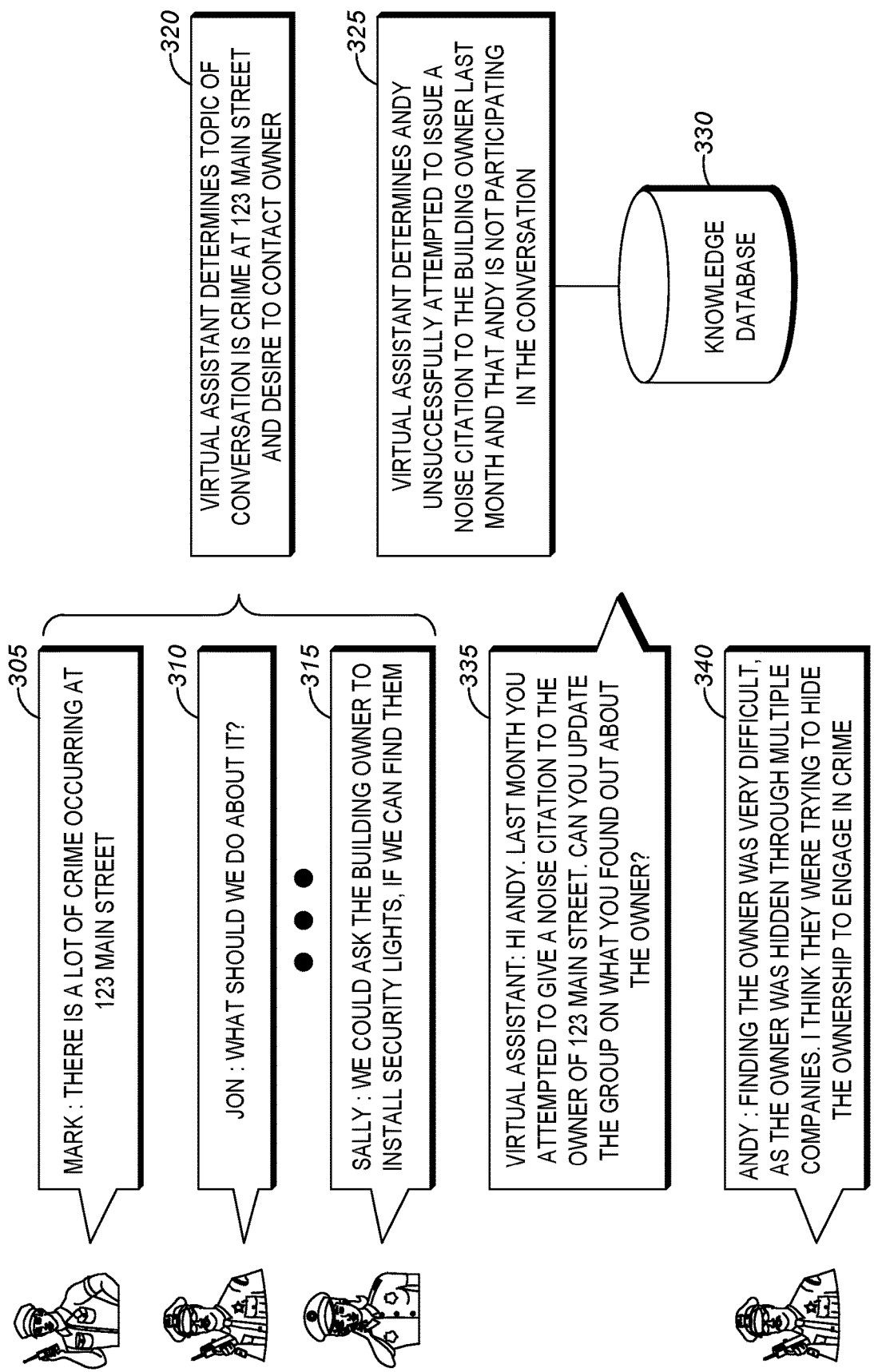
FIG. 3 is an example conversation wherein a question is generated to encourage group discussion participation.

FIG. 3 is an example conversation wherein a question is generated to encourage group discussion participation. FIG. 3 depicts a conversation that may occur on a talkgroup. In the example shown in FIG. 3, assume there are 4 members of the talkgroup, Mark, Jon, Sally, and Andy. For purposes of this description, assume the topic of discussion is the rate of crime at a particular address. In box 305, Mark may state, "There is a lot of crime occurring at 123 Main Street." At this point, the conversational analytics system may not yet have enough information to determine what the topic of discussion might be. It could be crime generally or something related to the specific address.

In box 310, Jon may state, "What should we do about it?" indicating that the topic of discussion may be what actions the talkgroup participants should take. The conversation may continue on with further discussion (not shown). At box 315, Sally may state, "We could ask the building owner to install security lights, if we can find them."

The conversational analytics system (i.e. the virtual assistant) may monitor the talkgroup conversation between Mark, Jon, and Sally. The virtual assistant in box 320 may determine that the topic of conversation is crime at 123 Main Street and a desire to contact the owner of that building. As mentioned above, the techniques described herein are not dependent on any particular type of conversational analytics system, and any currently available or future developed system would be usable by the techniques described herein. There are many existing techniques for determining topics based on a corpus of data, such as voice communications or documents.

In box 325, the virtual assistant may determine that Andy is not participating in the discussion. This may be determined by monitoring, either at Andy's user device or the infrastructure controller, that Andy has not pressed his PTT button (or has not pressed it a sufficient number of times or for sufficient duration) to indicate that he is participating in the discussion.

Once the virtual assistant has determined that Andy is not sufficiently participating in the discussion, the virtual assistant may access one or more knowledge databases 330 (described in further detail below) to determine if Andy has any knowledge related to the topic of discussion that might be useful to the other members of the talkgroup (e.g. Mark, Jon, and Sally). If the virtual assistant determines that Andy has no useful information to provide, the virtual assistant may not take any further action because if Andy has nothing useful to provide to the discussion, there is no need to encourage him to participate (absent him wanting to participate like Mark, Jon, and Sally).

In the present example, in box 325, the virtual assistant may learn from the database that Andy unsuccessfully attempted to issue a noise citation to the building owner last month. Although the virtual assistant could directly provide this information on the talkgroup itself, doing so would prevent any further insight that Andy has on the topic of discussion, that might not be in the knowledge database 330, from being provided to the members of the talkgroup.

Instead, the virtual assistant may encourage Andy to provide knowledge that he has related to the topic of discussion. In one example method, the virtual assistant may provide this encouragement by asking Andy a question related to the topic of discussion which may prompt Andy to participate. It is often the case that directly addressing someone by name is more effective in getting them to participate than a general, non-directed question (e.g. "Does anyone have information about 123 Main Street).

In the present example, the virtual assistant at box 335, may output on to the talkgroup a question directed at Andy. For example, the virtual assistant may say, "Hi Andy. Last month you attempted to give a noise citation to the owner of 123 Main Street. Can you update the group on what you found out about the owner?" It should be noted that the virtual assistant could have simply stated that Andy attempted to give a noise citation to the building owner last month, because that is the information in the database. However, this does not include information that Andy may have that is not the type of information that would be stored in a database.

For example, upon hearing a question directed to him, in box 340 Andy may respond by saying, "Finding the owner was very difficult, as the owner was hidden through multiple companies. I think they were trying to hide the ownership to engage in crime." By encouraging Andy to participate in the discussion, the group is able to gain insight into the nature of the owner of the building at 123 Main Street, mainly that they might be attempting to hide in order to engage in crime. This might not be the type of information that would be stored in the knowledge database, as it may have been a subjective opinion that Andy had, but not sufficiently fact based to be included in a system, such as a CAD system.

FIG. 4 is an example conversation wherein an appeal to a user's ego is generated to encourage group discussion participation. In the approach described with respect to FIG. 3, the user is directly asked a question related to the information that they may possibly have that is related to the topic of discussion. However, in some cases, even after having been addressed directly the non-participating member may not respond (e.g. the non-participating member believes he is too important to provide input into the topic of discussion). Instead of asking the member a question directly, the virtual assistant may create an appeal to the non-participating member's ego in order to encourage participation in the group discussion.

The example shown in FIG. 4 generally has the same flow as that described with respect to FIG. 3. However, in box 435, instead of directly asking Andy a question to encourage participation, the virtual assistant may first appeal to Andy's ego as a person exceptionally suited to provide input. For example, in box 435, the virtual assistant may being by saying, "Andy is an expert in tracking down building owners." This statement may make Andy feel exceptionally valued, as he is being specifically called out as an expert in the topic of discussion. The virtual assistant may then continue by saying, "Andy, do you have any thoughts on how to track down the owner of 123 Main Street?" By posing the question this way, Andy may be left with the feeling that he, and he alone (regardless of if true or not) is uniquely situated to provide guidance with respect to this particular topic of discussion.

In box 440, Andy may respond by saying, "Finding the owner is very difficult, as I think they were trying to hide the ownership to engage in crime. When I tried, I started by . . . " By appealing to Andy's ego, Andy may be more willing to participate in the topic of discussion, as he has now been announced as an expert with respect to the particular topic of discussion.

Figure 5A:
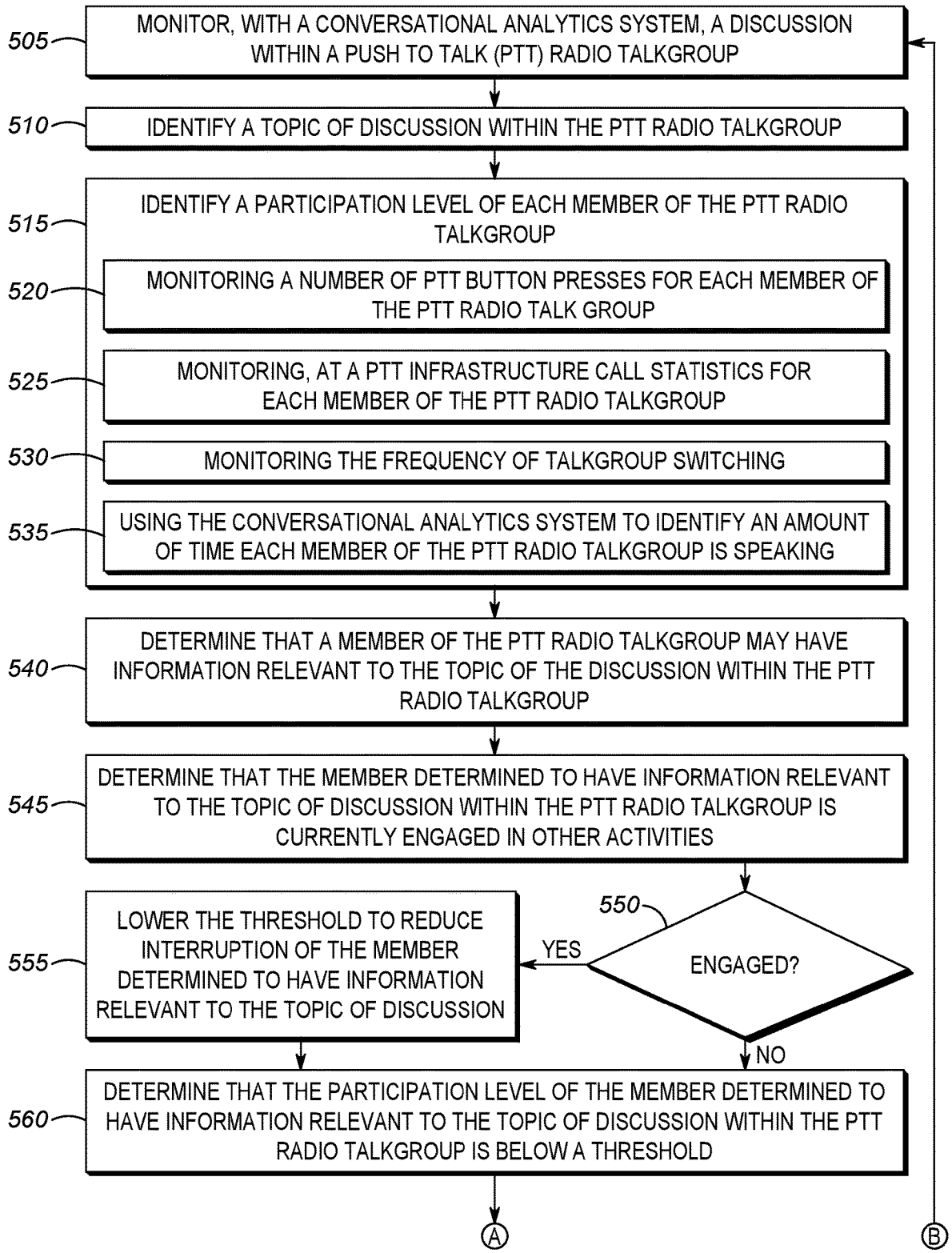
FIGS. 5A and 5B are an example flow chart depicting the encourage group discussion participation techniques described herein.
Figure 5B:
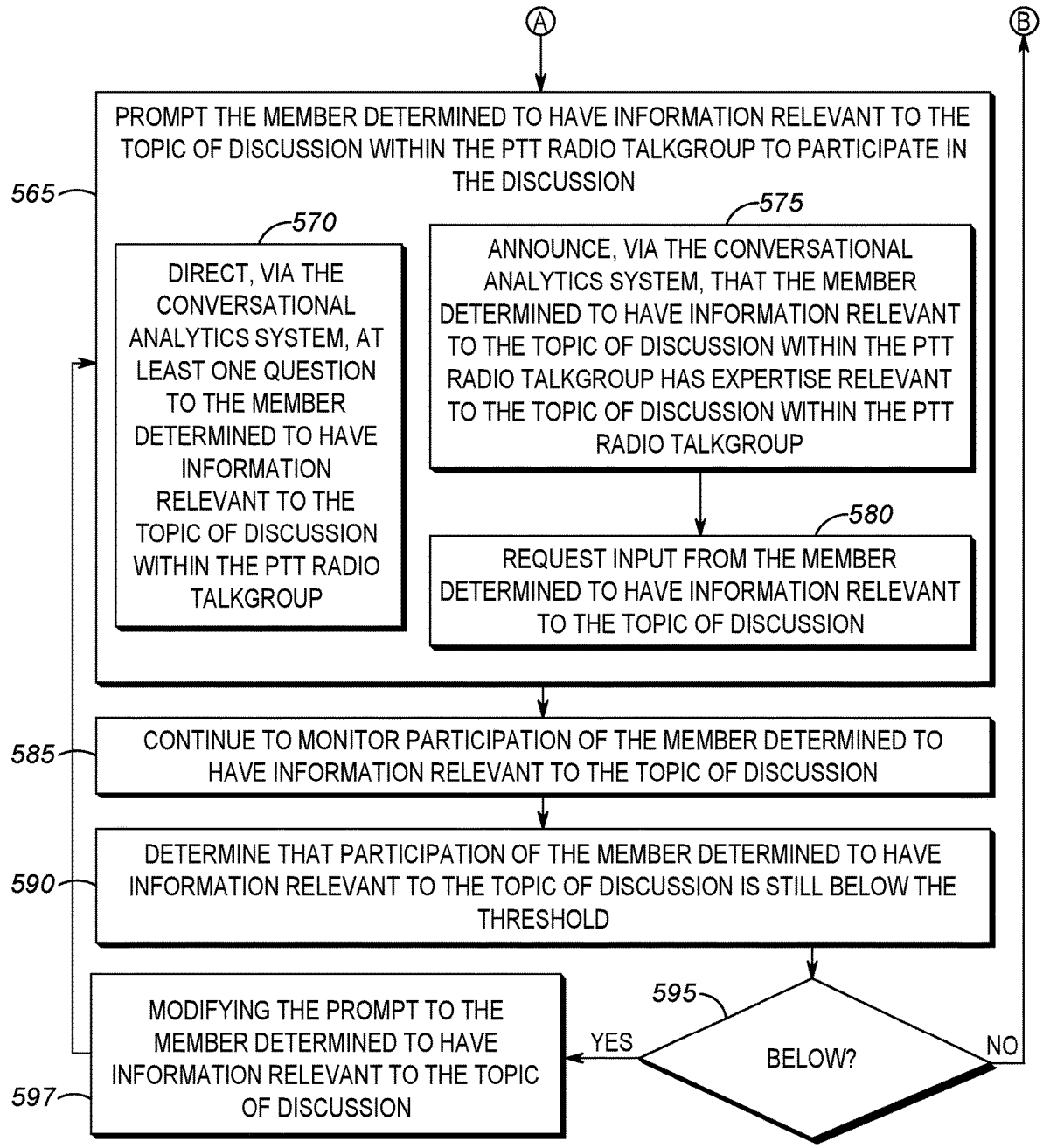

FIGS. 5A and 5B are an example flow chart depicting the encourage group discussion participation techniques described herein. In block 505, a conversational analytics system may monitor a discussion within a Push-to-Talk (PTT) radio talkgroup. AS described above, a talkgroup is a form of group communication that may be used by groups of people, such as public safety personnel. However, it should be understood that the techniques described herein are not limited to public safety personnel and may be used with any form of group communication. Although the group communication is most likely an audio communication, it should be understood that the techniques are not limited to audio communications.

In block 510, a topic of discussion within the PTT radio talkgroup may be identified. For example, a conversational analytics system implemented by a virtual assistant may be a part of the talkgroup and may receive all communications on the talkgroup. Using known conversational analytics techniques, a topic of the discussion on the talkgroup may be determined. As mentioned above, there are many available conversational analytics techniques that may perform syntactic and semantic analysis of a conversation to identify a topic of discussion. Any currently available or future developed conversational analytics techniques are useable with the techniques described herein.

In block 515, the participation level of each member of the talkgroup may be identified. A talkgroup can have as few as two members up to hundreds if not thousands of members. Each member may not participate in the talkgroup discussion to the same extent. Some members may not participate as they feel they have nothing to contribute to the discussion, are shy, or are too busy to participate in the topic of discussion on the talkgroup. There are many different ways that the virtual assistant can determine the level of participation of each member of the talkgroup.

In block 520, one example of a mechanism for determining the level of participation of a member of the talkgroup is provided. A number of PTT button presses may be monitored for each member of the PTT radio talkgroup. As explained above, in a PTT system, when a user wishes to speak to the talkgroup, they press and hold the PTT button while speaking. When they are finished speaking, they release the PTT button. By keeping track, at the user device, of the number of times the PTT button is pressed, this may serve as a proxy to the level of participation of the user. The more times the user presses their PTT button, the more times they are speaking on the talkgroup, and thus the greater participation. At the other end of the spectrum, if a user does not press their PTT button at all, this indicates that they are not participating in the discussion on the talkgroup. It should be noted in block 520, the PTT button presses may be monitored by the user device.

In block 525, another example of a mechanism for determining the level of participation of a member of the talkgroup is provided. Call statistics for each member of the PTT radio talkgroup may be monitored at a PTT infrastructure. As explained above with respect to block 520, the PTT button presses may be monitored by the user device. However, each PTT button press is transmitted to the PTT infrastructure in order to grant the user the floor of the PTT talkgroup in order to begin speaking. As such, in block 525, PTT button presses, or call statistics, such as floor grants can be monitored at the PTT infrastructure to determine how often each talkgroup member is requesting permission to speak on the talkgroup. Fewer requests to speak on the talkgroup means a lower level of participation in the discussion on the talkgroup.

In block 530, another example of a mechanism for determining the level of participation of a member of the talkgroup is provided. The frequency of talkgroup switching may be monitored. Generally a user may listen to one talkgroup at a time. However, there may be more than one talkgroup that the user has access to. For example, one talkgroup may be a general dispatch talkgroup, while a second talkgroup may be a tactical talkgroup (e.g a talkgroup for discussing something specific). It should be understood that these are simply examples of different types of talkgroups. If a talkgroup member is constantly switching between talkgroups, this may indicate that they are not truly engaged with any particular talkgroup. The level of participation in a talkgroup may be determined by how often the talkgroup member is switching away from the current talkgroup to listen to a different talkgroup.

In block 535, another example of a mechanism for determining the level of participation of a member of the talkgroup is provided. The conversational analytics system may be used to identify an amount of time each member of the PTT radio talkgroup is speaking. As mentioned above, the conversational analytics system may monitor the discussion on the talkgroup. As part of that monitoring, the conversational analytics system may determine the amount, such as a percentage of time, that each talkgroup member is speaking. Talkgroup members that are speaking for large portions of time are likely to be participating in the talkgroup discussion, while those that are not speaking at all or speaking for a lesser portion of time, are likely to not be participating in the discussion on the talkgroup.

What should be understood is that regardless of how determined, the conversational analytics system is able to determine the level of participation in the discussion of each member of the talkgroup.

In block 540, it may be determined that a member of the PTT radio talkgroup may have information relevant to the topic of discussion within the PTT radio talkgroup. Typically, this determination may be made by accessing one or more knowledge databases, which may store information related to each member. The knowledge databases can be any data source that stores information related to each member of the talkgroup. For example, a database may store a list of recent searches (e.g. Google searches, etc.) for each member to determine topics the member has recently been interested in.

A human resources database may capture a profile of each member that includes things such as specific skills and or training the member has, certifications in specific subject matter, qualifications of the member, past assignments, current assignment, roles having been assigned to the member. A CAD database may store information related to previous incidents the member has been assigned to, including the participants in those incidents, previous tasks within the incident that were assigned to the member, suspects and/or victims in the incident, the nature of the incident (e.g. specific code violation, etc.). The specific data sources are relatively unimportant. What should be understood is that the data sources may be used to determine if each member has some knowledge related to the topic of discussion on the talkgroup that may be of use to the other members of the talkgroup.

In block 545, it may be determined that the member determined to have information relevant to the topic of discussion within the PTT radio talkgroup is currently engaged in other activities. There may be many reasons that a talkgroup member is not participating in a talkgroup discussion. The simplest reason may be that the member is currently engaged in some other activity that is of higher priority than the topic of discussion on the talkgroup. For example, if a law enforcement officer is currently in a foot pursuit or testifying in court, participating in a talkgroup discussion may be of lower priority for that member. In such cases, it may be desirable to avoid disturbing the member who is engaged in other, higher priority activities.

In block 550, if it is determined that the talkgroup member is otherwise engaged, the process moves to block 555. In block 555, the threshold may be lowered to reduce interruption of the member determined to have information relevant to the topic of discussion. As will be explained in further detail below, the threshold may be used to determine if the talkgroup member who has knowledge related to the topic of discussion should be encouraged to participate in the discussion. By lowering the threshold for members engaged in other activities, there is less likelihood that the member engaged in other activities will be disrupted. However, in some cases, the member's knowledge may be so important to the topic of discussion that the member will be encouraged to participate in the discussion, even if they are currently engaged in other activities. In other words, the threshold may be set at least in part based on how important the member's knowledge is to the topic of discussion.

In block 560, it may be determined that the participation level of the member determined to have information relevant to the topic of discussion within the PTT radio talkgroup is below a threshold. In other words, it is determined that the member has knowledge related to the topic of the discussion, and the member is not participating in the discussion because their participation level is below a threshold participation level. Participation by the member may be useful as the member has information that may be relevant to the topic of discussion that other members of the talkgroup might find helpful. As explained above, in cases where the member is engaged in other activities, the threshold may be lowered. At the extreme end, the threshold could be set to zero, meaning that the member is not expected to participate in the discussion due to being engaged in other activities.

In block 565, the member determined to have information relevant to the topic of discussion within the PTT radio talkgroup may be prompted to participate in the discussion. In other words, because the member has information that is relevant to the topic of discussion, it would be helpful for the other members of the talkgroup to receive this information.

Because the member is not participating, they may need encouragement to participate in the topic of discussion on the talkgroup.

In block 570, one example mechanism for prompting participation is provided. The conversational analytics system may direct at least one question to the member determined to have information relevant to the topic of discussion within the PTT radio talkgroup. As explained above, a member may be more willing to participate in a talkgroup discussion if they are specifically asked to provide information to the other talkgroup members. In other words, it may be more difficult for an individual talkgroup member to ignore a request that is specifically addressed to that individual. The question may specifically ask the non-participating member about information that is determined to be relevant to the topic of discussion.

In block 575, another mechanism for prompting participation is provided. The conversational analytics system may announce that the member determined to have information relevant to the topic of discussion within the PTT radio talkgroup has expertise relevant to the topic of discussion within the PTT radio talkgroup. In this way the entire talkgroup, as well as the member who has the information, is informed that the non-participating member is an expert in the topic of discussion. Being acknowledged as the expert in a particular topic may cause the non-participating member to participate due to an elevated sense of ego (e.g. bragging rights, etc.) that they are an expert in the topic of discussion and that the talkgroup is relying on that level of expertise that can only be provided by the non-participating member.

In block 580, input may be requested from the member determined to have information relevant to the topic of discussion. This may be very similar to the question generated in block 570. However, instead of the question directly asking for input from the non-participating member, the question may be phrased such that it appears that the non-participating member is being asked for guidance. This again may inflate the non-participating members ego, in that they may feel that the talkgroup would be lost without the invaluable guidance provided by the non-participating member.

In block 585, participation of the member determined to have information relevant to the topic of discussion may continue to be monitored. It is possible that even with the mechanisms to encourage participation described above, the non-participating member may still not participate in the discussion on the talk group. In block 590, it may be determined that participation of the member determined to have information relevant to the topic of discussion is still below the threshold. In other words, even though participation in the discussion has been encouraged, the member is still not sufficiently participating in the discussion.

In block 595, if it is determined that the participation level is still below the threshold, the process may move to block 597. In block 597, the prompt to the member determined to have information relevant to the topic of discussion may be modified. For example, instead of generating a generic question to generally ask about the information relevant to the topic of discussion, the questions could be more focused requiring more specific answers. For example, instead of asking, "What do you know about address 123 Main Street?" a series of questions could be provided. For example, "When was the last time you went to 123 Main Street? Who did you meet with there? Was the owner present? Did the owner appear to be evasive?" What should be understood is that if the non-participating member does not participate when asked generally for information relevant to the topic of discussion, the virtual assistant may then ask more directed questions intended to draw out more detailed responses.

Figure 6:
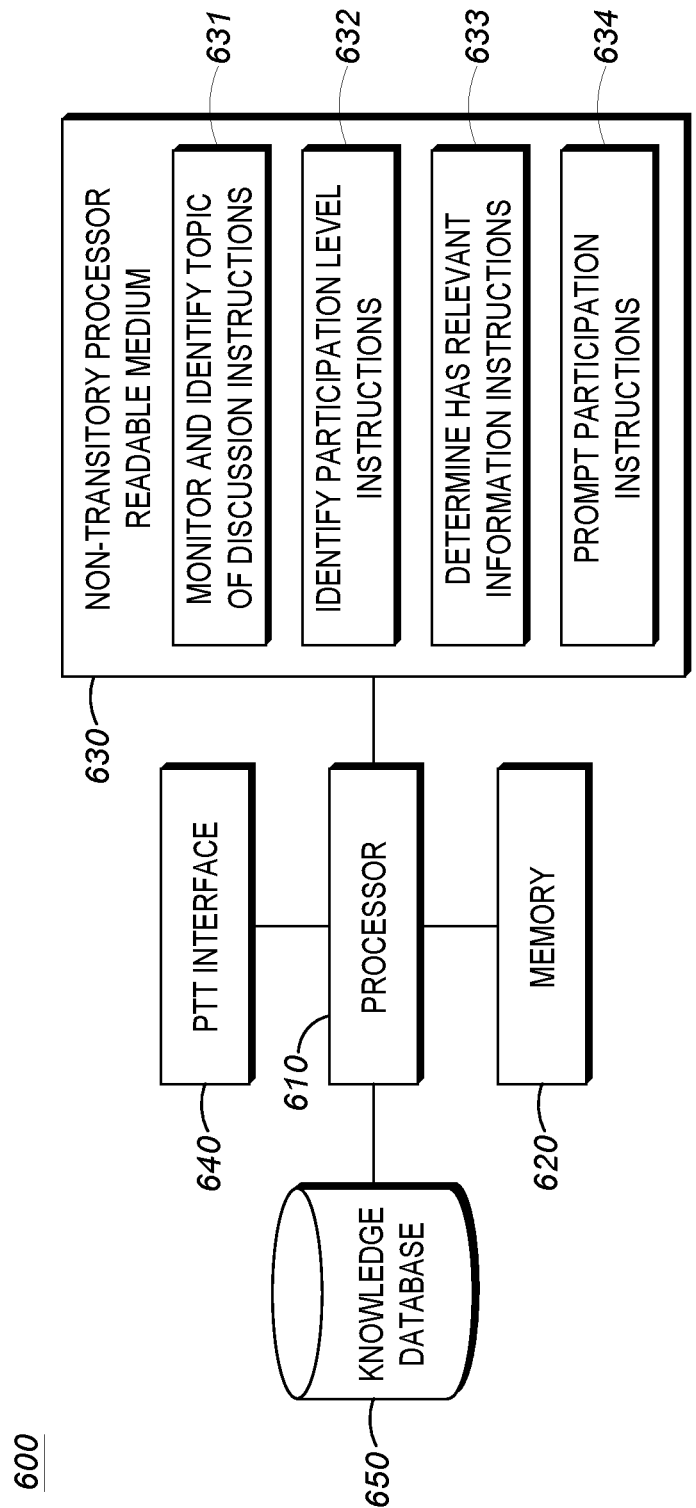
FIG. 6 is an example of a device that may implement the virtual assistant conversational analytics system to enable the encourage group discussion participation techniques described herein.

FIG. 6 is an example of a device 600 that may implement the virtual assistant conversational analytics system to enable the encourage group discussion participation techniques described herein. It should be understood that FIG. 6 represents one example implementation of a computing device that utilizes the techniques described herein. Although only a single processor is shown, it would be readily understood that a person of skill in the art would recognize that distributed implementations are also possible. For example, the various pieces of functionality described above (e.g. discussion topic identification, participation determination, question generation, etc.) could be implemented on multiple devices that are communicatively coupled. FIG. 6 is not intended to imply that all the functionality described above must be implemented on a single device.

Device 600 may include processor 610, memory 620, non-transitory processor readable medium 630, PTT interface 640, and knowledge database 650.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include monitor and identify topic of discussion instructions 631. The monitor and identify topic of discussion instructions 631 may cause the processor to monitor the discussion that is occurring on a talkgroup to identify the topic that is being discussed. For example, by using conversational analytics techniques. The talkgroup discussion may be monitored via PTT interface 640, which may allow for a connection between device 600 and the infrastructure controller 156 and or user equipment 104. The monitor and identify topic of discussion instructions 631 are described throughout this description generally, including places such as the description of blocks 505-510.

The medium 630 may include identify participation level instructions 632. The identify participation level instructions 632 may cause the processor to determine, for each member of the talkgroup, how much they are participating in the discussion. This can be done via detecting the amount of time each user has pressed the PTT button via the PTT interface or using conversational analytics to determine the amount of time each member of the talkgroup is speaking. The identify participation level instructions 632 are described throughout this description generally, including places such as the description of blocks 515-535.

The medium 630 may include determine has relevant information instructions 633. The determine has relevant information instructions 633 may cause the processor to determine if each member of the talkgroup has information that is relevant to the topic of discussion. For example, the processor may access the knowledge database 650 to determine if each member of the talkgroup has information relevant to the current topic of discussion on the talkgroup. In addition, the processor may determine if each member of the talkgroup is engaged in other activities and should not be disturbed. This may be achieved by raising the threshold.

The determine has relevant information instructions 633 are described throughout this description generally, including places such as the description of blocks 540-560.

The medium 630 may include prompt participation instructions 634. The prompt participation instructions 634 may cause the processor to prompt participation in the discussion by members of the talkgroup who are not participating and have information relevant to the topic of discussion, if their participation level is below a threshold. The participation can be encouraged by posing questions and/or statements directed to the non-participating member of the talkgroup. If the non-participating member still does not begin participating, the generated questions could be altered to encourage participation either by appealing to the members ego or breaking the questions down into more manageable questions. The prompt participation instructions 634 are described throughout this description generally, including places such as the description of blocks 565-597.

3. Conclusion

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
monitoring, with a conversational analytics system, a discussion within a Push to Talk (PTT) radio talkgroup;
identifying a topic of discussion within the PTT radio talkgroup based on the monitoring with the conversational analytics system;
identifying a participation level of each member of the PTT radio talkgroup, wherein identifying the participation level of each member of the PTT radio talkgroup further comprises monitoring a frequency of talkgroup switching;
determining that a member of the PTT radio talkgroup may have information relevant to the topic of the discussion within the PTT radio talkgroup based on accessing at least one of a computer aided dispatch database, a human resources database, and a search history database for all talkgroup members;
determining that the participation level of the member determined to have information relevant to the topic of discussion within the PTT radio talkgroup is below a threshold; and
prompting the member determined to have information relevant to the topic of discussion within the PTT radio talkgroup to participate in the discussion wherein the prompting further comprises:
directing, via the conversational analytics system, at least one question related to the topic of discussion to the member determined to have information relevant to the topic of discussion within the PTT radio talkgroup.

2. The method of claim 1 wherein identifying the participation level of each member of the PTT radio talkgroup further comprises at least one of:
monitoring a number of PTT button presses for each member of the PTT radio talkgroup; and
monitoring, at a PTT infrastructure, call statistics for each member of the PTT radio talkgroup.

3. The method of claim 1 wherein identifying the participation level of each member of the PTT radio talkgroup further comprises:
using the conversational analytics system to identify an amount of time each member of the PTT radio talkgroup is speaking.

4. The method of claim 1 wherein prompting the member determined to have information relevant to the topic of discussion within the PTT radio talkgroup to participate in the discussion further comprises:
announcing, via the conversational analytics system, that the member determined to have information relevant to the topic of discussion within the PTT radio talkgroup has expertise relevant to the topic of discussion within the PTT radio talkgroup; and
requesting input from the member determined to have information relevant to the topic of discussion.

5. The method of claim 1 further comprising:
determining that the member determined to have information relevant to the topic of discussion within the PTT radio talkgroup is currently engaged in other activities; and
lower the threshold to reduce interruption of the member determined to have information relevant to the topic of discussion.

6. The method of claim 1 further comprising:
continuing to monitor participation of the member determined to have information relevant to the topic of discussion;
determining that participation of the member determined to have information relevant to the topic of discussion is still below the threshold; and
modifying the prompt to the member determined to have information relevant to the topic of discussion.

7. A system comprising:
a processor; and
a memory coupled to the processor, the memory containing a set of instructions thereon that when executed by the processor cause the processor to:
monitor, with a conversational analytics system, a discussion within a Push to Talk (PTT) radio talkgroup;
identify a topic of discussion within the PTT radio talkgroup based on the monitoring with the conversational analytics system;
identify a participation level of each member of the PTT radio talkgroup, wherein the instructions to identify the participation level of each member of the PTT radio talkgroup further comprises instructions to monitor a frequency of talkgroup switching;
determine that a member of the PTT radio talkgroup may have information relevant to the topic of the discussion within the PTT radio talkgroup based on accessing at least one of a computer aided dispatch database, a human resources database, and a search history database for all talkgroup members;
determine that the participation level of the member determined to have information relevant to the topic of discussion within the PTT radio talkgroup is below a threshold; and
prompt the member determined to have information relevant to the topic of discussion within the PTT radio talkgroup to participate in the discussion wherein the prompt further comprises:
at least one question related to the topic of discussion to the member determined to have information relevant to the topic of discussion within the PTT radio talkgroup.

8. The system of claim 7 wherein the instructions to identify the participation level of each member of the PTT radio talkgroup further comprises instructions to at least one of:
monitor a number of PTT button presses for each member of the PTT radio talkgroup; and
monitor, at a PTT infrastructure, call statistics for each member of the PTT radio talkgroup.

9. The system of claim 7 wherein the instructions to identify the participation level of each member of the PTT radio talkgroup further comprises instructions to:
use the conversational analytics system to identify an amount of time each member of the PTT radio talkgroup is speaking.

10. The system of claim 7 wherein the instructions to prompt the member determined to have information relevant to the topic of discussion within the PTT radio talkgroup to participate in the discussion further comprises instructions to:
announce, via the conversational analytics system, that the member determined to have information relevant to the topic of discussion within the PTT radio talkgroup has expertise relevant to the topic of discussion within the PTT radio talkgroup; and
request input from the member determined to have information relevant to the topic of discussion.

11. A non-transitory processor readable medium containing a set of instructions thereon that when executed by a processor cause the processor to:
monitor, with a conversational analytics system, a discussion within a Push to Talk (PTT) radio talkgroup;
identify a topic of discussion within the PTT radio talkgroup based on the monitoring with the conversational analytics system;
identify a participation level of each member of the PTT radio talkgroup, wherein the instructions to identify the participation level of each member of the PTT radio talkgroup further comprises instructions to monitor a frequency of talkgroup switching;
determine that a member of the PTT radio talkgroup may have information relevant to the topic of the discussion within the PTT radio talkgroup based on accessing at least one of a computer aided dispatch database, a human resources database, and a search history database for all talkgroup members;

determine that the participation level of the member determined to have information relevant to the topic of discussion within the PTT radio talkgroup is below a threshold; and prompt the member determined to have information relevant to the topic of discussion within the PTT radio talkgroup to participate in the discussion wherein the prompt further comprises:

at least one question related to the topic of discussion to the member determined to have information relevant to the topic of discussion within the PTT radio talkgroup.

12. The medium of claim 11 wherein the instructions to identify the participation level of each member of the PTT radio talkgroup further comprises instructions to at least one of:

monitor a number of PTT button presses for each member of the PTT radio talkgroup; and monitor, at a PTT infrastructure, call statistics for each member of the PTT radio talkgroup.

13. The medium of claim 11 wherein the instructions to identify the participation level of each member of the PTT radio talkgroup further comprises instructions to:

use the conversational analytics system to identify an amount of time each member of the PTT radio talkgroup is speaking.

14. The medium of claim 11 wherein the instructions to prompt the member determined to have information relevant to the topic of discussion within the PTT radio talkgroup to participate in the discussion further comprises instructions to:

announce, via the conversational analytics system, that the member determined to have information relevant to the topic of discussion within the PTT radio talkgroup has expertise relevant to the topic of discussion within the PTT radio talkgroup; and request input from the member determined to have information relevant to the topic of discussion.

* * * * *